United States Patent [19]

Wamstad

[11] Patent Number: 5,029,478

[45] Date of Patent: Jul. 9, 1991

[54] FLUID ISOLATED SELF-COMPENSATING ABSOLUTE PRESSURE SENSOR TRANSDUCER

[75] Inventor: David B. Wamstad, Roseville, Minn.

[73] Assignee: Honeywell Inc., Minneapolis, Minn.

[21] Appl. No.: 555,244

[22] Filed: Jul. 19, 1990

[51] Int. Cl.[5] ............................ G01L 7/12; G01L 9/04
[52] U.S. Cl. ...................................... 73/706; 73/708; 73/726; 73/729; 338/4
[58] Field of Search ................ 73/706, 708, 718, 719, 73/720, 721, 722, 717, 723, 724, 725, 726, 727, 728, 729, DIG. 4; 338/4, 42; 361/283; 336/30; 29/621.2, 25.41, 25.35

[56] References Cited

U.S. PATENT DOCUMENTS

| | | | |
|---|---|---|---|
| 3,247,719 | 4/1966 | Chelner | 73/726 |
| 3,427,884 | 2/1969 | Delmonte | 73/398 |
| 4,006,640 | 2/1977 | Gealt | 73/393 |
| 4,184,189 | 1/1980 | Davis et al. | 361/283 |
| 4,196,632 | 4/1980 | Sikorra | 73/718 |
| 4,321,578 | 3/1982 | Nagasu et al. | 338/42 |
| 4,399,707 | 8/1983 | Wamstad | 73/727 |
| 4,467,394 | 8/1984 | Grantham et al. | 361/283 |
| 4,498,070 | 2/1985 | Lirman | 73/726 |
| 4,600,912 | 7/1986 | Marks et al. | 338/42 |

FOREIGN PATENT DOCUMENTS

2186376 8/1987 United Kingdom ............... 73/721

Primary Examiner—Donald O. Woodiel
Attorney, Agent, or Firm—John J. Gresens

[57] ABSTRACT

An absolute pressure sensor capsule and sensor resulting therefrom are disclosed. In one preferred embodiment, the capsule includes a sensor die of a first material, an intermediate spacer of a second material joined to the die and a base plate of a third material, the base plate having a variable thickness for changing the span shift, null shift, and static pressure of the die while compensating for changes in the calibration of the electrical die components.

31 Claims, 4 Drawing Sheets

FLUID ISOLATED SELF-COMPENSATING ABSOLUTE PRESSURE SENSOR TRANSDUCER

FIELD OF THE INVENTION

The present invention generally relates to pressure sensors and transducers. More specifically, the present invention relates to fluid isolated self-compensating absolute pressure sensors which allow for varying span shift, null shift and static pressure without changing the electrical characteristics of the sensor.

BACKGROUND OF THE INVENTION

Pressure sensors have been used for any number of applications in the past. In use, however, certain drawbacks arise depending on the many applications in which the sensor is used. Previously sensors were not completely isolated. As a result there was generally no means to prevent exposure of the sensor internal mechanisms to often harmful and destructive environments such as salt water.

Moreover, when isolated, these sensors were often unable to transmit the sensed force in a manner which accurately reflected the force as initially sensed by the transducer. Previous sensors have generally also not been equipped to prevent overactivation or overpressure forces which often destroy the sensors.

Sensors previously developed in this field include Delmonte, U.S. Pat. No. 3,427,884, which discloses a diaphragm element having a flexible tubular support wall or and an exposed thin flexible diaphragm that extends transversely across the support wall. Gealt, U.S. Pat. No. 4,006,640, discloses a pressure to current transmitter having an internal fluid chamber separated from the process fluid by a diaphragm and backup plate. Davis et al, U.S. Pat. No. 4,184,189, disclose an inexpensive glass capacitive pressure sensor. Sikorra, U.S. Pat. No. 4,196,632, discloses the apparatus including first and second support elements of fused quartz and an intermediately positioned thin diaphragm of the same material.

Nagasu et al, U.S. Pat. No. 4,321,578, disclose a dual sided pressure transducer arranged to hold a semiconductor pressure sensor in a housing. Wamstad, U.S. Pat. No. 4,399,707, discloses a stress sensitive semiconductor die and housing comprising a recessed ceramic base.

Marks et al, U.S. Pat. No. 4,600,912, disclose a diaphragm-type pressure sensor employing a monocrystalline wafer as a pressure-responsive diaphragm. Grantham et al, U.S. Pat. No. 4,467,394, disclose a three plate silicon-glass-silicon capacitive pressure transducer.

While these patents disclose pressure sensors and sensor elements which advance this field of technology, the previously mentioned problems still exist and are satisfied by the present invention.

SUMMARY OF THE INVENTION

Generally, the absolute pressure sensor capsule of the present invention has a sensor die of a first material, an intermediate spacer of a second material, and a base plate of a third material having a variable thickness for changing the span shift, null shift, and static pressure of the die while compensating for changes in the calibration of the electrical die components.

A further embodiment of the present invention provides a sensor including the pressure sensor capsule and a housing surrounding the capsule. The housing generally contains a header comprising an open ended cavity for housing the capsule. The cavity has a configuration substantially matching the capsule and a size permitting a substantial clearance fit of the capsule into the cavity. The housing also contains a fluid in the cavity surrounding the capsule, and a diaphragm covering the open end of the cavity and having a variable thickness and convolutions for maintaining the linearity of the pressure response over varying temperatures.

DETAILED DESCRIPTION OF THE PREFERRED EMBODIMENTS

Figure 1:
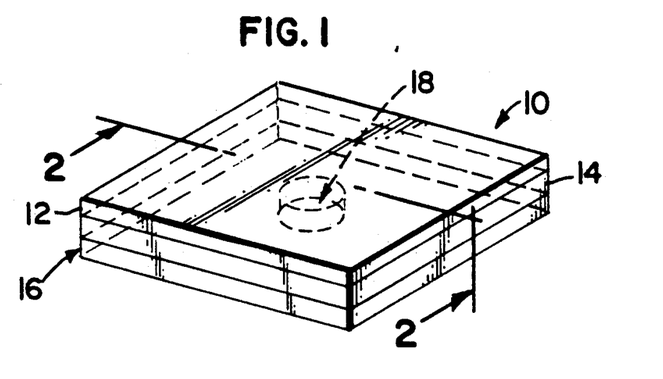
FIGURE 1 is a perspective view of one embodiment of the pressure sensor capsule in accordance with the present invention.

Referring to the drawings wherein like numerals represent like parts throughout the several views, there is generally shown in FIG. 1, an absolute pressure sensor capsule 10. The absolute pressure sensor capsule 10 generally has a sensor die 12 of a first material, an intermediate spacer 14 of a second material, and a base plate 16 of a third material. The base plate 16 may have a variable thickness for changing the span shift, null shift, and static pressure of the die while compensating for changes in the calibration of the electrical die components.

THE PRESSURE SENSOR CAPSULE

Figure 2:
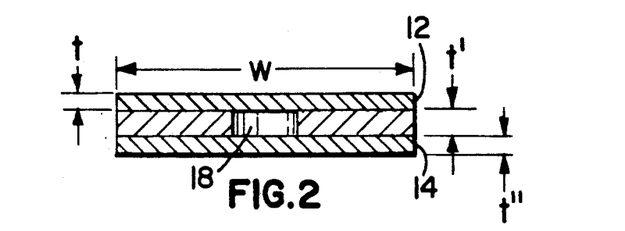
FIG. 2 is a cutaway side view taken along line 2—2 of the pressure sensor capsule shown in FIG. 1.

As can be seen in FIGS. 1 and 2, one embodiment of the present invention is a three element capsule comprising a die 12, a spacer 14 having a central aperture 18, and a base plate 16. Turning first to the die 12, this element of the capsule 10 provides a piezo-reactive material for holding electrical circuitry such as resistors, diodes, capacitors, and electrical interconnects, or combinations thereof. In the context of this disclosure, die 12 may comprise piezo-reactive strain sensitive material which may be used to measure strain through piezo-resistance or conductance by deflection of the material.

Generally, the die 12 may be any semiconductive material which is strain sensitive. Preferable materials include silicon, gallium arsenide, silicon composites, silicon nitride, silicon sapphire, and the like. Most preferably, the material used to fabricate the die is silicon due to its generally high and regular piezo reactivity and relative affordability.

Generally, the die 12 may take any variety of physical shapes. However, a square die is generally preferred as a square element is much easier to cut than a round element. The physical dimensions of the die, being the thickness t, width W, and overall area or footprint of the die surface, are controlled by any number of factors, FIG. 2.

The thickness (t) of the die depends upon the pressure range which is to be measured in the given application. Generally, the die of the present invention may be used to measure pressure over any range. As a general guideline pressure is measurable with the various embodiments of the present invention range from about 1 psi to well over 10,000 psi. Also as a general guideline, when higher pressures are to be measured, (W) should be minimized to reduce the amount of stress between the die 12 and the aperture 18 in the center of the spacer 14. However, (t) should be monitored closely to ensure that the die will still allow adequate deflection given the expected pressure.

Accordingly, there is a tolerance between the thickness (t) of the die and the width (W) of the die. In any given application these two parameters must be adjusted to provide optimal results. Generally, the thickness of the die will range from about 0.001 inch to about 0.020 inch, understanding that thicknesses outside this range may be appropriate for a given application.

Concurrently, the width (W) of the die may generally range from about 0.060 inch to about 0.175 inch. Generally, the greater the thickness (t) of the die, the larger (W) must be to ensure adequate deflection.

The next element of the preferred capsule is the intermediate spacer 14, FIG. 2. The spacer 14 functions to provide an aperture 18 which is a deflection area when the die 12 is placed under pressure. The spacer 14 also functions to create a vacuum reference through aperture 18, ensuring the provision of an absolute pressure sensor.

Generally, the spacer may be any material having a substantially similar coefficient of expansion to the die. The spacer material should also be suitable for the formation of a vacuum reference and susceptible to bonding with the die through any number of processes including electrostatic or thermoelectric bonding, and the like. Generally, such materials should be able to pass a current at a high temperature in order to be susceptible to these types of bonding processes. The materials preferred for formation of the spacer should also be fairly rigid, high compressive strength materials so as to provide elements which can be readily sealed to form the capsule vacuum. Generally, any number of silica composite glasses may be used for the spacer 14. Especially preferable are borosilicate glasses such as glasses sold under the tradenames Pyrex TM, Nonex TM, or uranium glass. These materials have been found to be preferable due to their rigidity, high compressive strength, and their overall susceptibility to electrostatic bonding processes.

Generally, the spacer may take any number of physical or structural dimensions or forms. The thickness of the spacer may vary depending upon whether or not the capsule 10 is bonded to a housing through fixed adhesion, i.e. permanent bonding, or through flexible adhesion. Flexible adhesion generally provides the necessary stability to affix the capsule in any sensor during sensor construction, e.g., placement and attachment of leads and the like. However, a flexible adhesive joint does not have to be, and may not necessarily be preserved over the life of the sensor.

Generally, fixed bonding of the capsule 10 to a housing is used to affix a capsule having a spacer of greater thickness. A thicker spacer ensures that extraneous forces received by the sensor are dissipated over the span of the capsule and not transmitted to the capsule die from the housing. For the purposes of this disclosure, extraneous forces are those forces which are transported to the housing through means other than by way of the deflection of the diaphragm.

Figure 4:
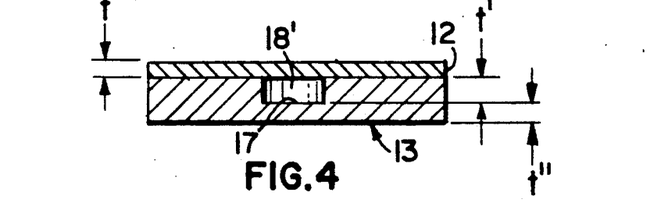
FIG. 4 is a cutaway side view taken along line 4—4 of the pressure sensor capsule shown in FIG. 3.

Preferably, the thickness (t'), FIGS. 2 and 4, of the spacer will vary from about 0.015 inch to about 0.5 inch.

Here again, the spacer 14 may take any variety of shapes including circular or square. If the spacer is circular, it may either circumscribe or be inscribed by the die 12. However, preferably the spacer may be square as a square shape is more easily cut from the intended material.

The pressure sensor capsule of the present invention may also comprise an autonymous base plate 16 in addition to the spacer 14 and die 12, FIG. 2. The base plate generally functions to complete the absolute vacuum reference of the capsule. Moreover, the base plate functions to provide circuit compensation. Circuit compensation is effected by changing the base plate thickness (t'') in relationship to the die thickness (t). Finally, the base plate serves as a seat for adhesive 40 which is used to affix the capsule 10 to the housing 20.

The relevance of circuit compensation arises with the construction of the sensor capsule 10. Generally, the materials used in the capsule 10 and especially the base plate 16, are selected and varied to allow use of the most affordable bonding processes available. Varying the materials used for each of the base plate 16, spacer 14, and die 12 also ensures accurate definition of the force or pressure applied to the sensor given substantially similar but not totally equivalent coefficients of expansion between these materials. However, the use of more than one material to make the elements of the capsule results in the incorporation of stresses and pressures which must be compensated to insure accurate registration of the sensed pressure.

Generally, once an end use is defined, and the appropriate materials selected, the span shift, null shift, and static pressure may be minimized or even varied by varying the thickness t''of the base plate 18, FIG. 2. By varying t'', there may be no need to use external circuitry and the like to compensate for the stresses resulting from the use of more than one material in the capsule.

In providing variable sensor characteristics, the thickness t'' of the base plate 16 may be increased or decreased to minimize or vary the null shift, span shift and static pressure of the capsule depending on the requirements of any given sensor application. In the meantime, variance of t'' may not require recalibration of the electrical components mounted on the die by external circuitry as the structure and materials used to make the capsule compensate for variance in t''.

Generally, the base plate 18 may be any number of materials which are susceptible to bonding to the spacer and have a relatively similar coefficient of expansion to the die in spacer element.

Materials useful in formation of the base plate 18 are those materials which are members of the same family useful in forming the die 12 of the pressure sensor capsule of the present invention. Namely, silicon, gallium arsenide, silicon composites, silicon nitride, silicon sapphire and the like may all be used in the formation of the base plate 18 of the present invention.

The base plate 16 may take any variety of shapes as a general rule. However, a base plate having a square shape is generally preferable to other shapes as a square may be more easily and accurately cut from a wafer of silicon. Additionally, it is possible to form a number of small square pieces which may be used interchangeably as the die element 12 and the base plate 16 of a number of pressure sensor capsules.

The physical parameters of the die are generally dictated by the intended application of the pressure sensor capsule and the amount of pressure to which the capsule is to be subjected. Generally, the thickness of the base plate (t''), FIG. 2, is 0.5 to 3 times the thickness (t) of the die. However, keeping in mind that the pressure sensor capsule may be subjected to pressure at both the die 12 and the base plate 18, the thickness (t'') of the base plate should not be so small as to allow for punch-through or perforation resulting from overpressure within the transducer.

Figure 3:
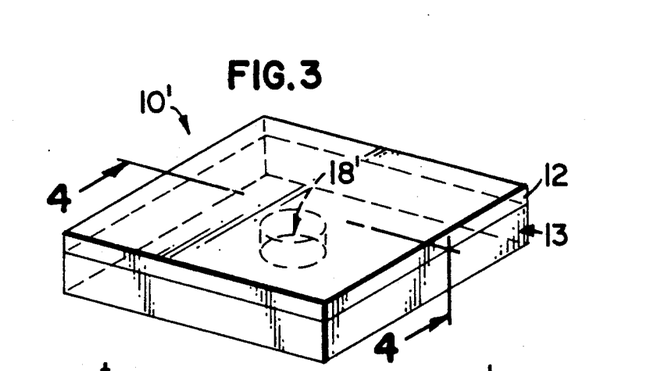
FIG. 3 is a perspective view of an alternative embodiment of the pressure sensor capsule of the present invention.

An alternative embodiment of the present invention can be seen in FIGS. 3 and 4. In this instance, the base plate and spacer are combined into one element, 13, FIG. 4. In this instance, the pressure sensor capsule comprises a die 12, and base plate 13. In this embodiment, the base plate 13 has a central opening or cavity 18', FIG. 3. The same considerations apply t the relative thickness of the die 12, (t), and the lower thickness (t'') of the base plate 13 as can be seen in FIG. 4 and as in the previous embodiment. In this instance, (t'') may be 0.5 to 3 times (t).

However, in order to facilitate bonding of the die 12 and the base plate 13, these components generally comprise two different materials. Similar to the previous embodiment of the pressure sensor capsule, the die 12 may comprise any strain sensitive material. Materials such as silicon, gallium arsenide, silicon composites, silicon nitride, silicon sapphire and the like are all useful with silicon being preferable.

The base plate 13 which comprises an aperture 18' should preferably comprise a material which has a similar, but not equivalent coefficient of expansion to the strain sensitive material used for the die 12 but somewhat different so as to be susceptible to affordable bonding processes while allowing for a constant reproducible stress which can be compensated for by the system.

In manufacturing, the base of this embodiment of the capsule, FIGS. 3 and 4, the aperture 18' may be defined by any number of methods well known to those of skill in the art. Methods such as finite element analysis, and the like are all useful for determining the thicknesses of the die, spacer (when used), and base plate. In the meantime, cavity 18' may be formed by drilling, chemical etching, or any other such methods known to those of skill in the art which will provide accurate definition of cavity 18' and proper definition of base plate lower thickness t'' as measured by the cavity bottom surface 17 and the base plate second surface 15, see FIG. 4. When formed, the aperture 18' will extend partially into the base plate 13 first surface which will ultimately abut the die 12 back surface. Generally, the depth to which the aperture 18' will extend into base 13 depends on the intended sensor application, capsule materials, and desired base plate 13 lower thickness (t''), FIG. 4. The aperture capsule cavity 18, depth may range from preferably 0.015 inch to 0.050 inch but can be any size depending upon the specific application and keeping in mind that the lower base plate thickness (t'') may be 0.5 to 3 times the die thickness (t).

Here again, materials useful to form the base plate of this embodiment of the present invention include silicon composites such as borosilicates including Pyrex TM, Nonex TM and uranium glass.

CAPSULE FABRICATION

The pressure sensor capsule of the present invention may be constructed by means known to those of skill in the art. Returning to FIG. 1, generally, one method of fabricating the instant pressure sensor capsule is by forming the die 12 and base plate 16 from a single wafer of the same material through cutting. The spacer 14 may then be formed through similar cutting means. All elements are then lapped, polished, and cleaned. All three elements of the capsule are then bonded together through any variety of means known to those with skill in the art including thermoelectric or electrostatic (or "TE") bonding, adhesive bonding, solder bonding and the like. Gold-silicon utectic bonding, and glass fritting are also viable means of joining the components of the capsule. In fact, any method of bonding may be used which creates a hermetic seal or vacuum reference in aperture 18 to ensure the formation of an absolute pressure sensor.

Preferably TE bonding mechanism will be used to construct the capsule through the combined use of temperature and voltage. In this instance, the system will generally be heated to about 500° C. Sufficient current will then be passed through the system to provide approximately 1,000 volts to the capsule. The entire bonding process is undertaken in a vacuum chamber to ultimately result in a vacuum reference in aperture 18 preferably having a pressure of $1 \times 10^{-6}$ millimeters of mercury or less.

To ensure that the device is truly hermetically sealed providing a repeatable stable measurements due to a repeatable stable stress level, the capsule may be tested over time to ensure the provision of consistent pressure readings. Alternatively, the hermetic seal of the capsule may be tested by bombarding the capsule with helium to detect the introduction of this gas into the aperture 18.

ABSOLUTE PRESSURE SENSOR

Figure 5:
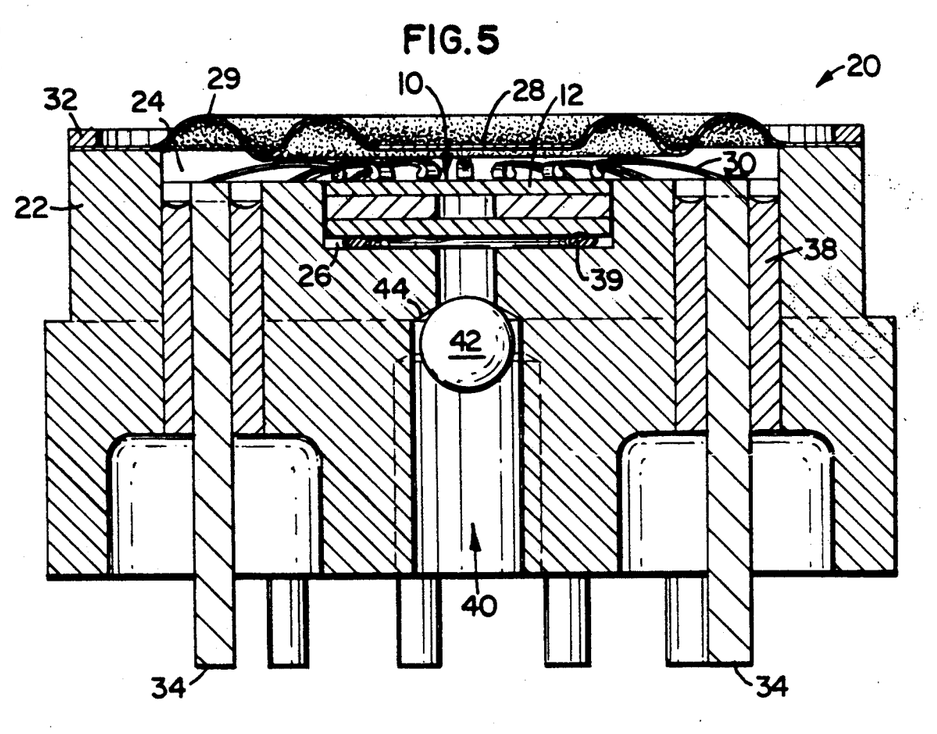
FIG. 5 is a cutaway side view of one embodiment of an absolute pressure sensor in accordance with the present invention incorporating the pressure sensor capsule depicted in FIGS. 1 and 2.
Figure 6:
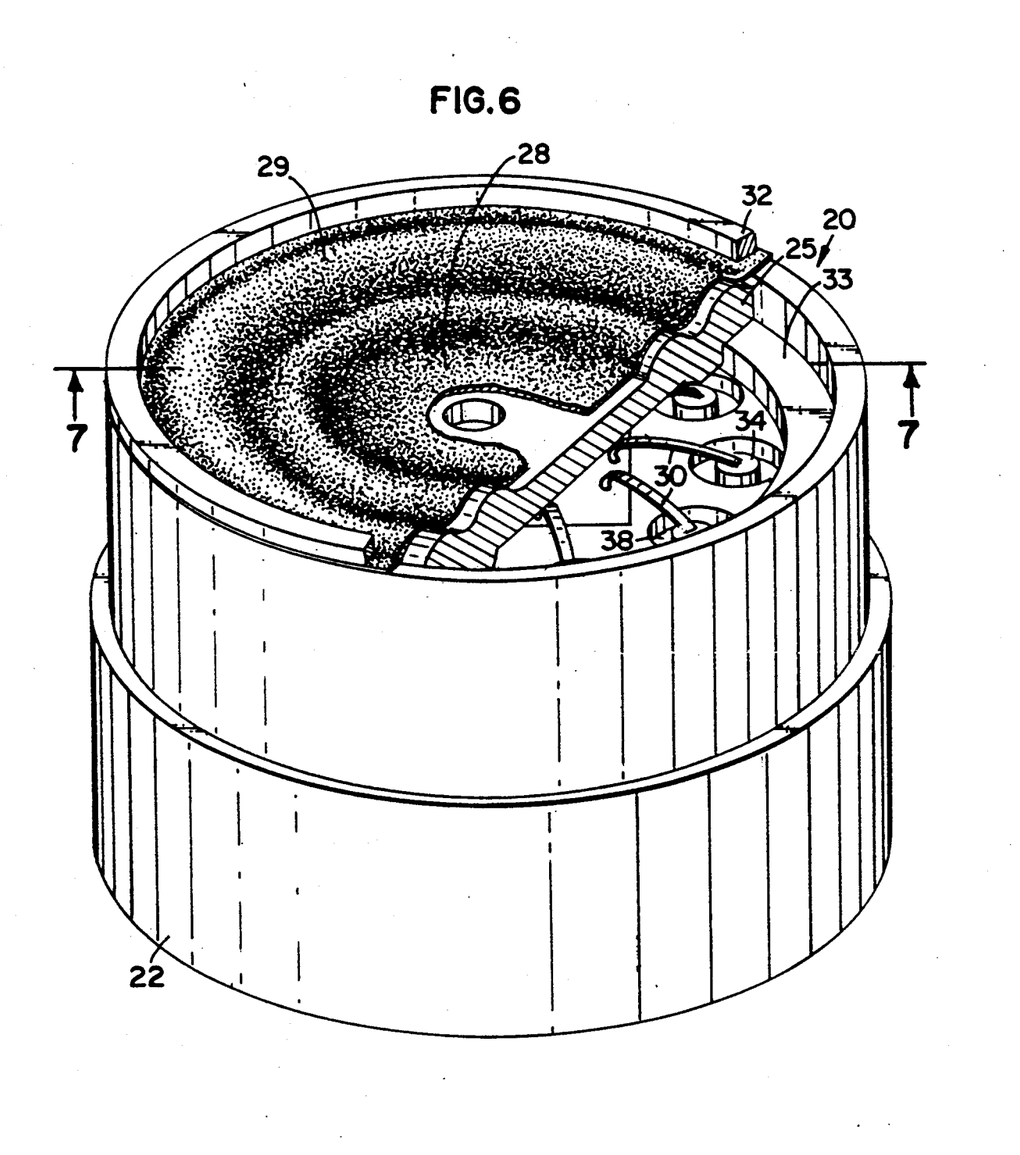
FIG. 6 is a cutaway perspective view of a preferred embodiment of an absolute pressure sensor in accordance with the present invention also incorporating the pressure sensor capsule depicted in FIGS. 1 and 2.
Figure 7:
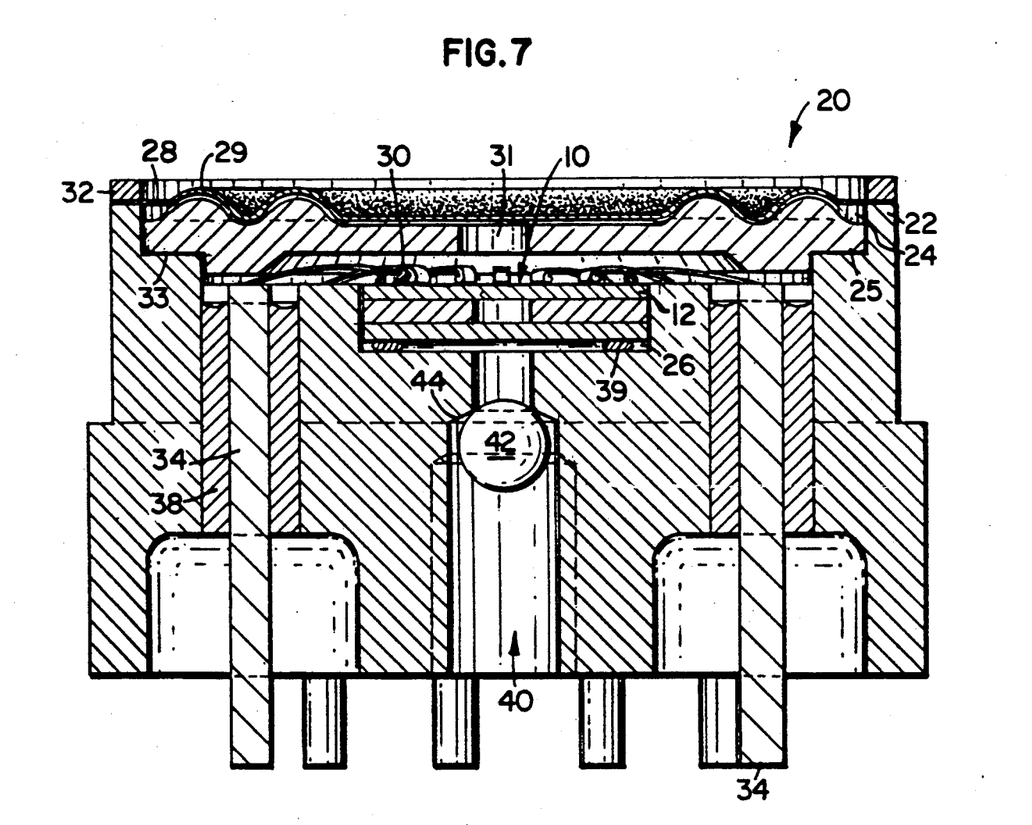
FIG. 7 is a cutaway side view taken along lines 7—7 of the absolute pressure sensor capsule depicted in FIG. 6.

In accordance with a further aspect of the present invention there is also provided a pressure sensor, as can be seen in FIGS. 5-7. This sensor generally comprises the isolated absolute pressure sensor capsule 10 or 10' previously defined and shown in FIGS. 1-4, and a housing 20.

In turn, the housing 20 comprises a header having a cavity for containing a capsule such as those shown in FIGS. 1-4 at 10 and 10'. For purposes of explaining the sensor capsule 10 has been used in FIGS. 5-7 with the understanding that any variety of capsules could be included in the sensor. The header cavity optionally may have two areas, one area 26 being an interior volume having a configuration substantially matching the capsule 10 and allowing clearance fit of the capsule 10 into the cavity. The second area 24 of the cavity allows clearance for the placement of connecting leads 30 between the capsule 10 and electrical terminal pins 34 as well as clearance for deflection of the diaphragm 28.

The sensor 20 also generally comprises flexible adhesive means 40 for attaching the capsule 10 to the header 22 while permitting the fluid to substantially surround the capsule 10. A diaphragm 28 for isolating the capsule 10 covers the open end of cavity 24. Optionally, a spacer 25 may be positioned between the diaphragm 28 and the capsule 10, FIG. 7. Leads 30 join the capsule die 12 and electrical terminal pins 34.

Generally, as can be seen in FIG. 5, the pressure sensor of the present invention comprises a housing 20 positioned within which is the pressure sensor capsule 10. A principal element of the housing 20 is the header 22. The header 22 has a number of functions within the device including providing a hermetic, pressure proof system sealed at all surfaces against intended as well as extraneous pressure. Also, the header 22 unifies the sensor package providing an open-ended cavity, (24, 26), containing the pressure sensor capsule 10 as well as a fluid for transmitting the force sensed at the diaphragm to the capsule.

The header 22 may take any variety of forms and shapes. Generally, as can be seen in FIGS. 5-7, the header is a cylindrical structure having the diaphragm 28 across the exposed internal surfaces or cavities of the header 22. Electrical terminal pins 34 may protrude from the backside of the header 22. The exterior shape of the header 22 may vary depending upon the nature of the sensor application and the manner in which the sensor will be mounted. In the preferred mode, as seen in FIGS. 5-7, the header 22 is shaped cylindrically and designed so as to contain those elements necessary to transmit electrical impulses and to support the sensor capsule 10 while insulating the capsule 10 against extraneous forces.

The housing 20 also comprises fluid which is used to fill the open cavities 24 and 26 of the header 22. The fluid generally functions to transmit the pressure sensed at the diaphragm 28 to the pressure sensor capsule 10. Accordingly, the pressure sensor of the present invention is designed to allow the sensor capsule 10 to have a clearance fit within orifice 26 of 0.001 inch or greater. Clearance fit means that the design of the header 22 and pressure sensor capsule 10 must allow fluid to pass between the capsule side walls and the opposing walls of the header cavity 26 once the capsule 10 is in place, FIG. 5.

The choice of fluids is generally dictated by the temperature of the sensor application and may be any fluid which has a desirable coefficient of expansion. Variability of fluid choices is possible given the temperature range at which the pressure sensor will be used. Specifically, it is preferable to use fluids which have a low expansion coefficient in the temperature range in which the sensor will be applied. The housing is also designed to contain minimal fluid due to high coefficient of expansion properties of fluids. Generally void spaces in housing are designed to hold preferably less than 0.15 cc's of fluid and preferably less than 0.10 cc's ml of fluid. Preferably, the fluid should also be non-conductive so as not to short out the various exposed electrical leads 30 and 34. The fluid should be one which may be outgassed through any variety of conventional methods.

Fluids which have been found preferable in the fabrication and application of the sensor of the present invention include silicon fluids, fluorosilicone fluids, and hydrocarbon and fluorohydrocarbon oils known to be useful in high pressure instruments. These fluids all provide the necessary low coefficients of expansion and have been proven to be viable in high pressure environments.

The housing 20 also comprises a diaphragm 28, FIGS. 5-7. The diaphragm 28 functions to transmit external forces contacting the diaphragm 28 from the exterior of the housing 20 to the capsule 10 which is positioned within the header and in electrical contact with circuitry which transmits the electrical signal out of the housing.

The diaphragm 28 also protects the capsule 10 from hazardous external environments such as salt water and the like as well as any pressure media which may be deleterious to the long term survival of the capsule 10.

The diaphragm is generally a thin, strong material which will retain its rigidity and be chosen based on the pressure media with which it will come into contact. Materials which have been found to be preferable are metal alloys such as stainless steel, nickel alloys, titanium alloys due to their resistance to rusting and oxidation. Also useful in forming the diaphragm are synthetic polymers.

The diaphragm may range in thickness from a thinner more flexible element to a thicker more rigid element. Generally, the thickness of the diaphragm ranges from about 0.003 to 0.007, and most preferably from about 0.004 to 0.006, understanding that other thicknesses may be appropriate depending upon the application.

In construction of the sensor 20, the diaphragm may be attached to the header 22 over cavity 24 in any variety of means known to those of skill in the art including soldering, welding, glass fritting and the like. Preferably, the diaphragm 28 is attached to the header 22 by welding which allows for maximum strength and hermiticity.

As can be seen in FIGS. 5-7, the diaphragm may also contain ridges or convolutions 29 which extend above the plane of the diaphragm. These ridges compensate for expansion or contraction of the fluid when subjected to environments of varying temperature. The convolutions 29 also compensate for excessive deflection without creating abnormal stresses in the capsule. Specifically, these convolutions allow for deflection of the diaphragm either into the housing 20 or out of the housing 20 without drawing the capsule 10 out of its cavity 26. Generally, the number of convolutions 29 may vary from depending on the given application. In practice, as many as 15 annular convolutions have been found to be useful in defining the pressure sensor of the present invention.

The pressure sensor of the present invention also comprises electrical leads 30, 34. These electrical leads function to transmit pressure sensed by the capsule and translated into an electrical signal from the capsule 10 out of the header 22 and housing 20. Generally, consistent with these functions, any number of contacts, leads or other interconnecting circuitry can be used in the pressure sensor of the present invention.

Preferably, as can be seen in FIGS. 5-7, the electrical interconnect system generally comprises contact wires 30 which directly interconnect the circuitry on the surface of the die 12 with electrical terminal pins 34. The electrical terminal pins 34, in turn, take the electrical signals produced on the surface of the die 12 out of the pressure sensor housing to an external interface. Generally, the size of the header will increase with the number of pins 34 and other electrical interconnects.

Turning first to the contact wires 30, these wires may comprise any conductive material known to those of skill in the art. However, their design in the present invention allows for firm electrical ohmic contact with the die surface while also retaining a low profile within the header cavity 24 so as not to come into contact with diaphragm 28 when it is deflected inward toward the capsule 10.

Contact wires 30 are connected to the electrical terminal pins 34 which are generally positioned in the header 22 to circumscribe the capsule 10, FIG. 6. The electrical terminal pins 34 are generally positioned in the header 22 in any number of fashions consistent with their conducting function.

Preferably, the terminal pins 34 are positioned in the header 22 in a manner which insulates them from the actual header. If the header comprises conductive material such as stainless steel, electrical terminal pins 34 may be insulated from the header 22 by any nonconductive material 38. Appropriate insulating elements 38 may be any material which provides an adequate bond between the electrical terminal pins 34, and the header 22 and has a substantially similar thermal coefficient of expansion. Useful insulating materials include composite glass materials which provide a glass to metal bond. For example, materials such as Corning Glass 7052, borosilicate glass and the like have been found useful in providing such a structure.

The pressure sensor of the present invention may also comprise a spacer 25, adhesive means 40 to affix the pressure sensor capsule 10 into the sensor 20, and a fluid entry port 40 useful in introducing fluid into the sensor, FIGS. 6 and 7.

As can be seen in FIG. 7, the spacer 25 is generally positioned between the interior surface of the diaphragm 28 and the upper surface of the capsule 10 which is generally the die 12 of the capsule. The spacer 25 prevents overpressure or overactivation of the pressure transducer and minimizes the amount of fluid required to transmit the pressure sensed at the diaphragm 28 to capsule 10. Additionally, the spacer 25 functions to insulate the electrical contacts 30 from contacting the diaphragm 28.

The spacer 25 may comprise any number of materials such as metals, or metal alloys, composite materials, ceramics or glasses and the like. Preferably, the material chosen for the spacer will provide the strength necessary to support overpressure, while being dense enough not to absorb the fluid. Moreover, the material chosen for the spacer will preferably not outgas so as to create air pockets within the cavity (24, 26). Preferably, the spacer material will also be nonconductive. To this end, one material which has been found preferable is steel which has been coated with ceramic or porcelain outer coating.

One preferred embodiment of the spacer 25 can be seen in FIG. 7. The spacer 25 has a central aperture 31 which allows fluid transmission directly to the upper surface of the capsule 10. The spacer 25 has an exterior surface which generally follows the general pattern of the diaphragm 28 including the convolutions 29. Once subjected to overpressure, the spacer 25 will ultimately hit an interior protruding shelf 33 within the header 22, FIG. 7. Accordingly, when the sensor is subjected to pressures over the range for which it was designed, the spacer 25 will absorb this force.

The sensor of the present invention may also comprise adhesive means 40, FIGS. 5-7. The adhesive 39 affixes the pressure sensor capsule into the header cavity 26 allowing attachment of the contacts 30. Additionally, the adhesive provides a flexible means of retaining the capsule within this cavity once the sensor is placed into use. The adhesive is positioned to preferably allow the fluid to flow around and underneath the pressure sensor capsule so as to occupy the volume along side the capsule and between the base plate of the capsule and the lower surface of cavity 26.

The adhesive means may be any number of compositions which will provide either fixed or flexible support. Specifically, the adhesive may be any number of flexible or elastic thermoplastic or thermosetting adhesive compositions known to those of skill in the art. The intended adhesive may also be used with glass or ceramic beads which provide additional clearance between the bottom of the capsule and the header 22 once in place. Additionally, fritts, solders, and the like may be used to provide a fixed attachment of the pressure sensor capsule to the header 22 within cavity 26.

Generally preferable in the manufacture of the pressure sensor of the present device are adhesives including silicone adhesives, fluorosilicone adhesive, and the like which provide a flexible attachment of the pressure sensor capsule to the header cavity 26. This system has been found useful in initially securing the capsule 10 so that the electrical contacts 30 may be fixed to the capsule and the leads 34. In turn, once the pressure sensor is placed into use, the adhesive is generally considered flexible enough to allow the free floating of the pressure sensor capsule while contacts 30 help prevent the capsule from touching the sides of header cavity 26.

The sensor may also comprise a fluid entry port 40, FIG. 7. Fluid may be introduced into the sensor 10 and specifically header cavities 24 and 26 prior to the sealing of the diaphragm onto the header 22. A fluid entry port 40 may also be defined to allow the insertion or removal of fluid from the sensor without completely removing the diaphragm 28 and spacer 25. Accordingly, any number of fluid entry port means and sealing means may be used.

One preferable means of defining the fluid entry port 40 of the present invention is seen in FIG. 7. In this instance, the port 40 provides a communicating entryway between the exterior of the header 22 and the cavity 26 through which a fluid may be introduced into the header 22. This port may be closed or sealed by any variety of means including as shown, a ball 42 which sits in a seat 44 defined by a narrowing of the fluid entry port 40.

The foregoing specification, examples, and drawings provide a basis for understanding the invention. The invention can be made in any variety of embodiments without departing from the spirit and scope of the invention. Accordingly, the invention resides in the claims hereinafter appended.

I CLAIM AS MY INVENTION

1. An absolute pressure sensor capsule comprising:
   (a) a sensor die comprising a first material, a front surface with electrical components, and a back surface;
   (b) intermediate spacer means having an aperture for forming an absolute vacuum reference, the intermediate spacer means comprising a second material, the spacer means having first and second substantially parallel surfaces, the first spacer means surface being joined to the die back surface; and (c) base plate means comprising a base plate of a third material having a variable thickness for changing the span shift, null shift, and static pressure of the die while compensating for changes in the calibration of the electrical die components, the base plate means comprising first and second substantially parallel surfaces separated by the variable thickness, the first base plate surface being coupled to the second intermediate spacer means surface over the aperture to form the absolute vacuum reference with respect to the die.

2. The absolute pressure sensor capsule of claim 1 wherein the thickness of the base plate varies from about ½ to 3 times the die thickness.

3. The absolute pressure sensor capsule of claim 1 wherein the first material is piezo reactive and the first, second, and third materials have substantially similar coefficients of expansion.

4. The absolute pressure sensor capsule of claim 3 wherein the first and third materials comprise silicon and the second material comprises a glass composite.

5. The absolute pressure sensor of claim 1 wherein the electrical components are selected from the group consisting of resistors, diodes, capacitors, and electrical interconnects or combinations thereof.

6. An absolute pressure sensor capsule comprising:
(a) a sensor die comprising a first material, a front surface with electrical components, and a back surface; and
(b) base plate means for forming an absolute vacuum reference, the base plate means comprising a second material and first and second substantially parallel surfaces, the first surface having a cavity which extends to a predetermined depth into the base plate means, the base plate means having a lower thickness between the bottom of the cavity and the second base plate means surface, the base plate means lower thickness being variable for changing the span shift, null shift, and static pressure of the die while compensating for changes in the calibration of the die components, the first base plate means surface being coupled to the die back surface over the base plate means cavity to form the absolute vacuum reference with respect to the die.

7. The absolute pressure sensor capsule of claim 6 wherein the base plate thickness varies from about ½ to 3 times the die thickness.

8. The absolute pressure sensor capsule of claim 6 wherein the first material is piezo reactive and the first and second materials have substantially similar coefficients of expansion.

9. The absolute pressure sensor capsule of claim 8 wherein the first material comprises silicon and the second material comprises a glass composite.

10. A sensor comprising:
(a) an isolated absolute pressure sensor capsule comprising;
(i) a sensor die comprising a first material, a front surface with electrical components, and a back surface,
(ii) intermediate spacer means having an aperture for forming an absolute vacuum reference, the intermediate spacer means comprising a second material, the spacer means having first and second substantially parallel surfaces, the first spacer means surface being joined to the die back surface; and (iii) base plate means comprising a base plate of a third material having a variable thickness for changing the span shift, null shift, and static pressure of the die while compensating for changes in the calibration of the electrical die components, the base plate means comprising first and second substantially parallel surfaces separated by the variable thickness, the first base plate surface being coupled to the second intermediate spacer means surface over the aperture to form the absolute vacuum reference with respect to the die, and
(b) a housing surrounding the capsule, the housing comprising:
(i) a header comprising an open ended cavity for housing the capsule, the cavity having a configuration substantially matching the capsule and a size permitting a substantial clearance fit of the capsule into the cavity,
(ii) a fluid in the header cavity surrounding the capsule, and
(iii) diaphragm means comprising a diaphragm having a variable thickness and convolutions for maintaining the linearity of the pressure response over varying temperatures and for covering the open end of the header cavity, the diaphragm having a first side for retaining the fluid in the header cavity and a second side for sensing a pressure and transmitting the sensed pressure to the capsule through the fluid.

11. The sensor of claim 10 wherein the clearance between the capsule and the header is at least 0.001 inch.

12. The sensor of claim 10 wherein the thickness of the base plate varies from about ½ to 3 times the die thickness.

13. The sensor of claim 10 wherein the header comprises flexible adhesive means for providing attachment of the capsule to the header while permitting the fluid to substantially surround the capsule.

14. The sensor of claim 10 wherein the housing comprises spacer means having a hole for allowing the transmission of pressure to the capsule through the fluid when force is applied to the diaphragm while preventing overdrive of the diaphragm into the capsule, the spacer means positioned between the diaphragm and the capsule.

15. The sensor of claim 10 wherein the housing comprises leads connected to the die for carrying electrical signals to and from the die.

16. The sensor of claim 10 wherein the header comprises means for filling the cavity with fluid.

17. The sensor of claim 10 wherein the diaphragm has a thickness of 1.0 mil or less.

18. The sensor of claim 10 wherein the diaphragm comprises from 1 to 15 annular convolutions.

19. A sensor comprising:
(a) an isolated absolute pressure sensor capsule comprising;
(i) a sensor die comprising a first material, a front surface with electrical components, and a back surface; and
(ii) base plate means for forming an absolute vacuum reference, the base plate means comprising a second material and first and second substantially parallel surfaces, the first surface having a cavity which extends to a predetermined depth into the base plate means, the base plate means having a lower thickness between the bottom of the cavity and the second base plate means surface, the base plate means lower thickness being variable for changing the span shift, null shift, and static pressure of the die while compensating for changes in the calibration of the die components, the first base plate means surface being coupled to the die back surface over the base plate means cavity to form the absolute vacuum reference with respect to the die; and (b) a housing surrounding the capsule, the housing comprising:
  (i) a header comprising an open ended cavity for housing the capsule, the cavity having a configuration substantially matching the capsule and a size permitting a substantial clearance fit of the capsule into the cavity,
  (ii) a fluid in the cavity surrounding the capsule, and
  (iii) diaphragm means comprising a diaphragm having a variable thickness and convolutions for maintaining the linearity of the pressure response over varying temperatures and for covering the open end of the header cavity, the diaphragm having a first side for retaining the fluid in the header cavity and a second side for sensing a pressure and transmitting the sensed pressure to the capsule through the fluid.

20. The absolute pressure sensor capsule of claim 19 wherein the thickness of the base plate varies from about ½ to 3 times the die thickness.

21. A sensor comprising:
(a) an isolated absolute pressure sensor capsule, comprising;
  (i) a sensor die comprising a first material, a front surface with electrical components, and a back surface,
  (ii) intermediate spacer means having an aperture for forming an absolute vacuum reference, the intermediate spacer means comprising a second material, the spacer means having first and second substantially parallel surfaces, the first spacer means surface being joined to the die back surface; and
  (iii) base plate means comprising a base plate of a third material having a variable thickness for changing the span shift, null shift, and static pressure of the die while compensating for changes in the calibration of the electrical die components, the base plate means comprising first and second substantially parallel surfaces separated by the variable thickness, the first base plate surface being coupled to the second intermediate spacer means surface over the aperture to form the absolute vacuum reference with respect to the die; and
(b) a housing comprising:
  (i) a header comprising an open ended cavity for housing the capsule, the cavity having a configuration substantially matching the capsule and a size permitting a substantial clearance fit of the capsule into the cavity,
  (ii) a fluid in the cavity surrounding the capsule,
  (iii) flexible adhesive means for attaching the capsule to the header while permitting the fluid to substantially surround the capsule and for substantially preventing stress from being transmitted from the header into the capsule,
  (iv) diaphragm means comprising a diaphragm having a variable thickness and convolutions for maintaining the linearity of the pressure response over varying temperatures and for covering the open end of the cavity, the diaphragm having a first side for retaining the fluid in the cavity and a second side for sensing a pressure and transmitting the sensed pressure to the capsule through the fluid,
  (v) spacer means positioned between the diaphragm and the capsule for allowing the transmission of pressure to the capsule through the diaphragm and fluid while preventing overdrive of the diaphragm into the capsule, and
  (vi) leads connected to the die for carrying electrical signals to and from the die.

22. The sensor of claim 21 wherein the clearance between the capsule and the header is at least 0.001 inch.

23. The sensor of claim 21 wherein the header comprises means for filling the cavity with fluid.

24. The sensor of claim 21 wherein the thickness of plate varies from about ½ to 3 times the die thickness.

25. The sensor of claim 21 wherein the diaphragm has a thickness of 1.0 mil or less.

26. The sensor of claim 21 wherein the diaphragm comprises from 1 to 15 annular convolutions.

27. A sensor comprising:
(a) an isolated absolute pressure sensor capsule, comprising;
  (i) a sensor die comprising a first material, a front surface with electrical components, and a back surface; and
  (ii) base plate means for forming an absolute vacuum reference, the base plate means comprising a second material and first and second substantially parallel surfaces, the first surface having a cavity which extends to a predetermined depth into the base plate means, the base plate means having a lower thickness between the bottom of the cavity and the second base plate means surface, the base plate means lower thickness being variable for changing the span shift, null shift, and static pressure of the die while compensating for changes in the calibration of the die components, the first base plate means surface being coupled to the die back surface over the base plate means cavity to form the absolute vacuum reference with respect to the die, and
(b) a housing comprising:
  (i) a header comprising an open ended cavity for housing the capsule, the cavity having a configuration substantially matching the capsule and a size permitting a substantial clearance fit of the capsule into the cavity,
  (ii) a fluid in the cavity surrounding the capsule,
  (iii) flexible adhesive means for attaching the capsule to the header while permitting the fluid to substantially surround the capsule,
  (iv) diaphragm means comprising a diaphragm having a variable thickness and convolutions for maintaining the linearity of the pressure response over varying temperatures and for covering the open end of the cavity, the diaphragm having a first side for retaining the fluid in the cavity and a second side for sensing a pressure and transmitting the sensed pressure to the capsule through the fluid, (v) spacer means having a hole positioned between the diaphragm and the capsule for allowing the transmission of pressure to the capsule through the diaphragm and fluid while preventing overdrive of the diaphragm into the capsule, and (vi) leads connected to the die for carrying electrical signals to and from the die.

28. The sensor of claim 27 wherein the flexible adhesive means comprises an adhesive and glass beads.

29. The sensor of claim 27 wherein the header comprises means for filling the cavity with fluid.

30. The sensor of claim 27 wherein the diaphragm has a thickness of 1.0 mil or less.

31. The sensor of claim 27 wherein the diaphragm comprises from 1 to 15 annular convolutions.

* * * * *